April 24, 1962   R. S. SHREWSBURY   3,030,995
METHOD OF SECTIONIZING CITRUS FRUIT
Filed April 8, 1958   2 Sheets-Sheet 2
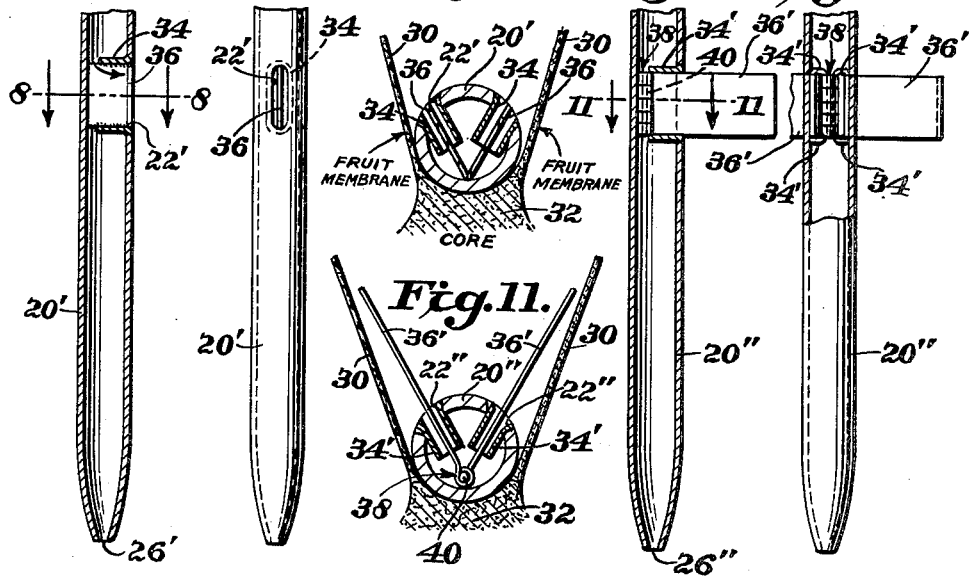
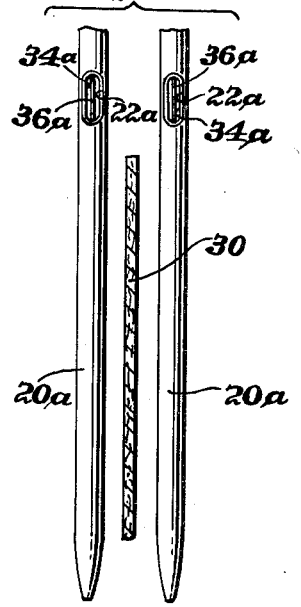
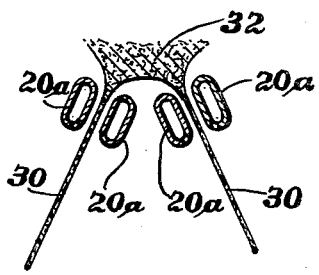
INVENTOR:
Robert S. Shrewsbury,
BY Cushman, Darby & Cushman
ATTORNEYS.

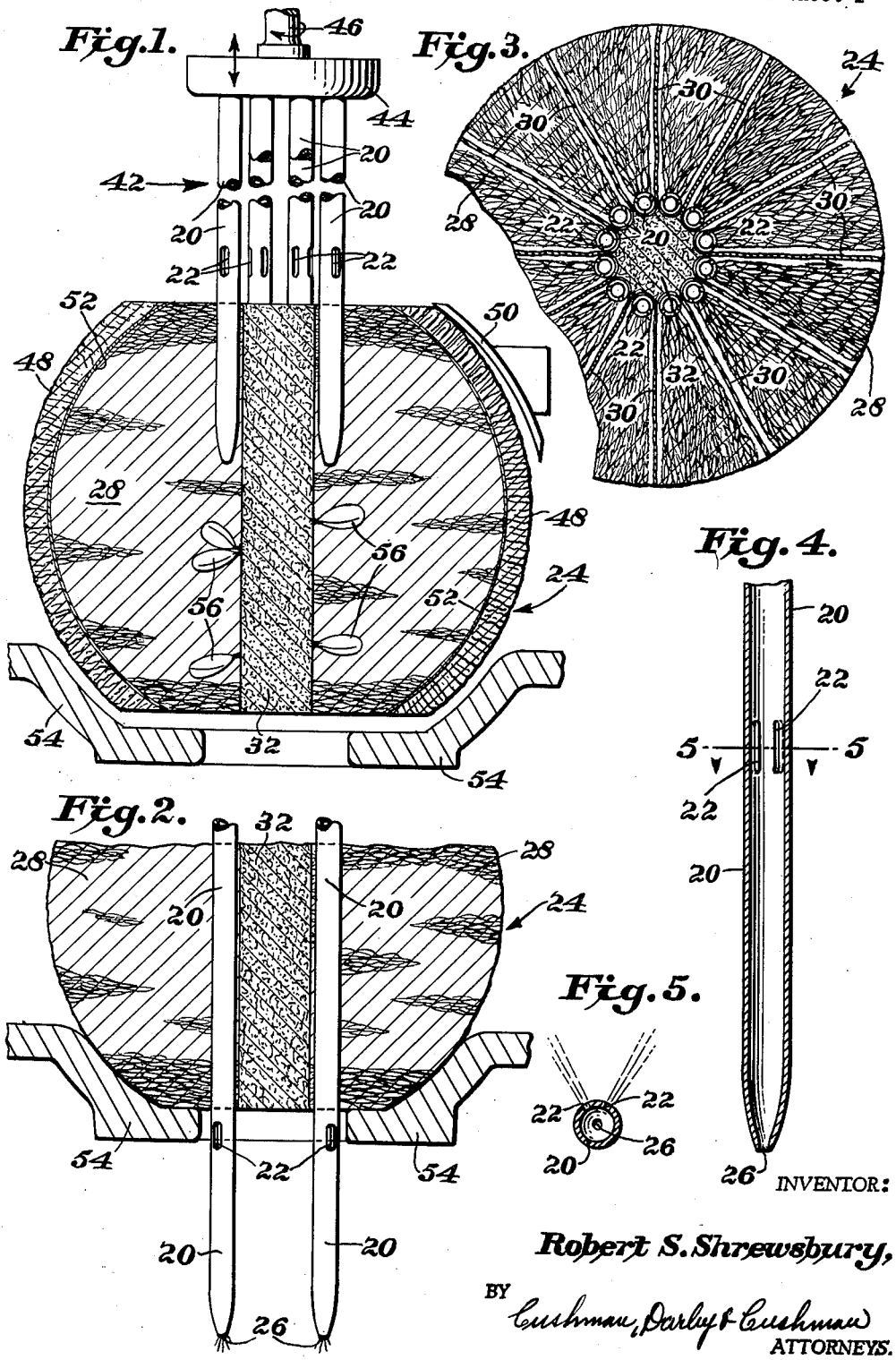

United States Patent Office 3,030,995
Patented Apr. 24, 1962

3,030,995
METHOD OF SECTIONIZING CITRUS FRUIT
Robert S. Shrewsbury, Dunedin, Fla., assignor to Vic-Mar Corporation, Dunedin, Fla., a corporation of Florida
Filed Apr. 8, 1958, Ser. No. 727,185
4 Claims. (Cl. 146—236)

This invention relates to the sectionizing of citrus fruits. In particular, it relates to procedures and means for effecting removal of the individual sections of a citrus fruit.

As is well known, citrus fruits, such as grapefruits, are composed of a plurality of individual generally wedge-shaped sections separated by membranes or walls extending radially from a central core. Each section is defined by juice bearing pulp, and a membrane surrounds the external, generally spherical shape defined by said sections, with an outer layer, known as the peel, defining the outer surface of the fruit.

Such fruits differ in size and shape, and the number, spacing and size of the individual sections therein likewise vary from one fruit to another. Furthermore, each section is extremely tender and easily crushed. Thus, the operation of removing the sections from the fruit involves numerous problems and difficulties which heretofore have made it virtually impossible to sectionize these fruits mechanically in a commercially satisfactory manner.

Machines have previously been proposed for sectionizing citrus fruits but they have usually been unduly complicated and intricate, not entirely acceptable commercially, and it is not uncommon for commercial sectionizing operations to be still performed by hand, cutting out a section at a time with a knife being selectively passed between the membranes and the sections by the worker.

Accordingly, the primary object of my invention is to provide novel and workable techniques, procedures and means capable of satisfactorily, efficiently and economically sectionizing citrus fruits mechanically.

Another object of the invention is to provide a novel method and apparatus utilizing streams of fluid under pressure to facilitate removal of the sections of citrus fruit.

A further object is to design an arrangement of fluid conveying tubular members and outlet constructions therefor rendering them particularly suitable for convenient insertion into and sectionizing of citrus fruits.

In a broad sense, my invention contemplates the injection into the fruit of fluid under pressure for radial flow along the membrane or wall separating adjacent sections of the fruit. It is proposed that a tubular member be inserted into the fruit adjacent one of the radial membranes thereof and include outlet means for directing fluid under pressure from said member radially along the membrane to separate the adjacent fruit section therefrom. The tubular member preferably is inserted into the fruit in the vicinity of and generally parallel to the core, between adjacent radial membranes, and is constructed and arranged to discharge jets of fluid under pressure in radially outward directions along the adjacent membranes to disengage or sever these membranes from the adajcent section of fruit.

In the preferred form of the invention, a plurality of these tubular members are arranged in a generally cylindrical outline whereby they may be simultaneously inserted longitudinally into the apex regions defined by the radial membranes of the fruit.

Further objects and advantages of the invention will be in part obvious and in part pointed out hereinafter.

The novel features of the invention may be best made clear from the following description and accompanying drawings in which:

FIGURE 1 is an elevational view of a tool embodying the invention and shown partially inserted into a citrus fruit, the latter being shown in vertical section;

FIGURE 2 is a fragmentary elevational view of the tool of FIGURE 1 and shown in a different position relative to the grapefruit;

FIGURE 3 is a fragmentary, horizontal sectional view of a citrus fruit with the fluid conveying tubular members of FIGURE 1 disposed in an exemplary position therein;

FIGURE 4 is a fragmentary, vertical sectional view of one form of a fluid conveying, tubular member adapted for use with the tool of FIGURE 1, and on an enlarged scale;

FIGURE 5 is a sectional view taken along line 5—5 of FIGURE 4;

FIGURE 6 is a fragmentary, vertical sectional view of a modification of the fluid conveying, tubular member of FIGURE 4;

FIGURE 7 is a fragmentary elevational view of the tubular member of FIGURE 6;

FIGURE 8 is a sectional view taken along line 8—8 of FIGURE 6, on an enlarged scale, and showing the disposition of the tubular member in the fruit;

FIGURE 9 is a fragmentary vertical sectional view of another modification of the tubular member of FIGURE 4;

FIGURE 10 is a fragmentary and partially sectioned view of the tubular member of FIGURE 9 rotated through approximately 90°;

FIGURE 11 is a sectional view taken generally along line 11—11 of FIGURE 9, on an enlarged scale and showing the disposition of the tubular member in the fruit;

FIGURE 12 is a fragmentary, elevational view of still another modification of the tubular member of FIGURE 4; and FIGURE 13 is a horizontal sectional view of a portion of a citrus fruit with the tubular members of FIGURE 12 disposed therein.

As previously indicated, the invention contemplates removal of sections from citrus fruits by the use of streams or jets of fluid under pressure directed in generally radial paths between the radial membranes and the fruit sections to thereby function as knives cutting the sections from the membranes. The fluid used preferably is a liquid, such as juice from similar citrus fruits, or water, or other liquid which will not chemically attack or otherwise impair the wholesomeness of the juice-containing fruit sections. It will be understood, however, that the invention, in its broadest aspects, also embraces the use of a suitable gas, inert or chemically not deleterious insofar as the fruit sections are concerned, as the cutting or severing fluid, as well as mixtures of liquids and gases.

The jets of pressurized fluid may be directed radially from the outer surface of the fruit inwardly toward the core, or they may be directed from a position adjacent the core radially outwardly. For illustrative purposes, the principles of the invention will be described in detail hereinafter in connection with structures shown in the drawings for directing the jets of pressurized fluid radially outwardly from the core.

It is preferred that the cutting jets or streams of fluid emanate from fluid conveying, tubular members arranged for insertion into the fruit adjacent the radial membranes thereof, these members being provided with lateral outlet means for guiding the discharging fluid in the proper directions.

Referring to the drawings, exemplary constructions for these tubular members are shown in FIGURES 4–11. The members shown in these FIGURES are adapted to be inserted longitudinally into the fruit, adjacent and parallel to the core thereof, and in the apex regions of the sections defined by the radial membranes, as indicated in FIGURES 3, 8 and 11. Another construction of the tubular members is shown in FIGURES 12 and 13 wherein two tubular members will be provided in each apex region, between adjacent membranes, as shown. In any case, the tubular members are provided with lateral outlet means whereby fluid under pressure will pass generally radially from the members along the radial paths between the fruit sections and membranes as these members are fed longitudinally through the fruit, as will be set out in more detail hereinbelow.

In the form of the invention shown in FIGURES 4 and 5, a slender tubular member 20 is provided with a pair of spaced and elongated lateral outlets 22 in its side wall intermediate its ends. The lower end of member 20 preferably is somewhat pointed or ogive-shaped to facilitate insertion into the fruit identified by numeral 24. And an aperture 26 may be provided at this end, as best seen in FIGURE 4, for a purpose to be explained hereinbelow. The other end of the member 20 will communicate with an appropriate source of fluid under pressure (not shown).

The construction and arrangement of the member 20 and outlets 22 therein are such that when the member is inserted into an apex region of a section 28 defined by adjacent fruit membranes 30 and passed longitudinally through the fruit, parallel to the core 32, as indicated in FIGURE 3, fluid under pressure will be discharged from outlets 22 along the adjacent membranes to remove the fruit section 28 therefrom. Passage of the member 20 through the fruit will be facilitated by fluid discharging axially forwardly from aperture 26.

The tubular members shown in FIGURES 6–11 are similar to that shown in FIGURES 4 and 5 but are provided with additional means in their outlets for more accurately guiding and concentrating the discharging fluid in the right direction. Similar numerals will be used to designate similar parts.

In the embodiment of FIGURES 6–8, nozzles 34 extend inwardly from the outlets 22′ in the tubular member 20′, as shown, and a fluid guiding vane 36 is arranged in each outlet as by engagement to the walls of the nozzle 34, in the manner shown. These vanes may terminate within the nozzle 34 or they may extend inwardly and engage the inside wall of member 20′, as best seen in FIGURES 6 and 8. In any event, the arrangement and disposition of the nozzles 34 and vanes 36 will aid in directing the fluid radially along the membranes 30, as indicated in FIGURE 8, thereby minimizing the dispersion of the fluid streams and concentrating them along the desired cutting planes or paths.

In the embodiment of FIGURES 9–11, the vanes 36′ extend through the nozzles 34′ in the outlets of the tubular member 20″. These vanes thus terminate outwardly of the member 20″, as shown, and may be hinged at their inner ends within the member 20″ whereby they are adjustable, within a limited range, to accommodate variations in the size and shape of the fruit sections 28 and to direct the fluid streams from outlets 22″ along the desired cutting planes. The hinge connection is indicated by numeral 38 and provides a hinge axis 40 parallel to the axis of the member 20″.

It is believed that the nozzles 34, 34′ in members 20′, 20″ will tend to reduce the forward velocity of the moving stream of fluid in the tubular members and convert the kinetic energy of this fluid into a pressure acting in the direction of the axis of these nozzles to force fluid in this direction for discharge through the outlets.

It should be understood that the shape of the outlets 22, 22′, 22″ may be varied from that shown.

An illustrative arrangement of a sectionizing tool embodying the invention is shown in FIGURES 1–3 and is identified by numeral 42. Although this tool is shown as including the members 20, it will be understood that in lieu of these members 20, the aforedescribed members 20′, 20″ or any other tubular members coming within the scope of my invention may be utilized. As shown, members 20 are arranged in parallelism in a generally cylindrical outline, depending from a head 44. A conduit 46 is connected to the head 44 and members 20 are in fluid communication through head 44 and conduit 46 with an appropriate source of fluid under pressure (not shown).

As best seen in FIGURE 3, twelve members 20 are carried by the head 44 for insertion into the apex regions of the sections 28 around the fruit core 32 and between the membranes 30. Inasmuch as the number of sections 28 surrounding the core 32 generally varies in number from 9–15 in average fruits, there may be provided a plurality of tools 42, each with a different number of members 20, between 9 and 15, and suitably spaced for use with a fruit 24 having a corresponding number of sections. An exemplary procedure for sectionizing with the tools 42 will now be described.

The fruit 24, in an unpeeled condition, may first have its top and bottom ends sliced off deeply enough to reveal the number of sections 28 therein, and to form an opening large enough in diameter to allow the proper number of tubular members 20 in tool 42 to go through the fruit and emerge on the other side. Once the ends of the fruit are so cut off, the fruit can be graded as to the number of sections. The fruit is then matched to a tool 42 having the proper number and spacing of members 20.

At this point, the members 20 on tool 42 will be partially inserted into the fruit in the apex regions of sections 28, between adjacent membranes 30, as shown in FIGURES 1 and 3. As indicated, the tool 42 will be chosen with the same number of members 20 as the fruit has sections 28, and any tendency to crush will be offset by the wide belt of peel 48 remaining on the fruit. During this step, the member 20 preferably are inserted into the fruit only deep enough to hold it firmly but not deep enough to let the outlets 22 enter the fruit (see FIGURE 1).

The remaining peel 48 on the fruit will now be removed. This may be done by rotating the head 44 to rotate the fruit 24 into engagement with a suitable cutter or knife, indicated schematically at 50, whereby the fruit will be completely peeled. For the purpose of this description, the conduit 46 may be considered as the means for rotating the head 44. It will be understood that a suitable machine member (not shown) may be provided in driving engagement with head 44 to effect rotation thereof, with an appropriate fluid-tight swivel connection being furnished between conduit 46 and head 44. And, although shown in vertical position, the head 44 and members 20 may be normally disposed for operation in a horizontal or other suitable position.

Instead of rotating the tool 42, the knife 50 may be moved around the fruit to effect the peeling. In any event, it will be appreciated that any suitable means may be employed for effecting the rotational and feeding movements between the tool 42 and knife 50 to peel the fruit in this operation.

After the fruit has been entirely peeled, the generally spherical shell or membrane 52 (see FIGURE 1) which may be left surrounding or enclosing the various sections 28 may be removed in any known manner, as by immersing the fruit in a conventional hot lye bath or the like. This will remove the outer membrane 52 but leave the radial membranes 30 and sections 28 intact.

The members 20 will now be forced farther through the fruit 24 and fluid under pressure will simultaneously be delivered to the members 20 for discharge through the outlets 22 and aperture 26 to sectionize the fruit by the cutting action described heretofore. During this cutting step, the bottom of the fruit 24 may be supported by suitable structure, such as that identified by numeral 54 in FIGURE 2, and in the manner there indicated. The jets discharging from apertures 26 will assist the axial feeding movement and help to push any seeds 56 in the fruit out of the path of members 20.

This final feeding movement of the members 20 through the fruit to sectionize it may be a continuous or an intermittent movement. In the former case, the fluid jets preferably will be discharged continuously beginning just before the outlets 22 enter the fruit (e.g., the position shown in FIGURE 1), and ending just after they emerge from the opposite end (e.g., the position shown in FIGURE 2); while in the latter case, the members 20 are moved in step-by-step fashion through the fruit with the fluid discharging from the outlets 22 only during periods of movement of the members 20.

It will be appreciated that the members 20 may be sufficiently long, with outlets 22 a sufficient distance from apertures 26, to enable these members to be inserted entirely through the fruit 24 before the outlets 22 enter the fruit. Or, the outlets 22 may be positioned adjacent aperture 26 and the members 20 first inserted entirely through the fruit before the remaining peel 48 is removed. Then, after the peel is removed, these members 20 are retracted or withdrawn (i.e., moved upwardly in FIGURE 2) as fluid is being supplied to the outlets 22 to effect the sectionizing, with the fruit being held by some appropriate means. In any case, it may not be necessary to deliver any fluid to the members 20 in tool 42 until after the peel 48 is completely removed, in the procedure described.

It has been found that best results are obtained by passing the members 20 quickly through the fruit 24, with the jets of fluid discharging from outlets 22 simultaneously with such movement and at relatively high pressures. The members 20 may be passed through the fruit in one direction and then the other while the fluid jets are discharging from outlets 22.

In lieu of a single member 20 for insertion into the apex region of each section 28, a pair of more slender fluid conveying, tubular members 20a may be utilized as illustrated in FIGURES 12 and 13. Such members 20a are provided with outlets 22a which may have a vane 36a and nozzle 34a therein similar to that shown in FIGURE 6. Each of these members 20a is intended to be inserted into the fruit along one surface of the membranes 30, as shown in FIGURE 13, with the outlet 22a facing radially outwardly along the adjacent membrane, the fluid discharging from these outlets to effect the cutting action in substantially the same manner as that described heretofore. As will be evident, these members 20a may be carried by head 44 of tool 42 in place of the members 20, with twice as many members 20a being used, in appropriate positions.

The present invention will thus be seen to completely and effectively accomplish the objects enumerated hereinabove. It will be realized, however, that various changes and substitutions may be made to the specific embodiments disclosed herein for the purpose of illustrating the principles of this invention, without departing from these principles. Therefore, this invention includes all modifications encompassed within the spirit and scope of the following claims.

I claim:

1. A process for sectionizing citrus fruit, said process including the steps of: ejecting fluid under pressure into a citrus fruit and in a substantially radial direction along a membrane of said fruit.

2. A process for sectionizing citrus fruit, said process including the steps of: ejecting jets of fluid under pressure into a citrus fruit, said jets being directed substantially radially outwardly and between the adjacent membranes and the adjacent section of the fruit to free said section.

3. A method of sectionizing citrus fruit, said method including the steps of: ejecting into a citrus fruit jets of liquid under pressure directed substantially radially outwardly along the inner or adjacent surfaces of the adjacent membranes of the fruit, and moving said jets axially through the fruit.

4. The method defined in claim 3 wherein a jet of fluid under pressure is ejected axially forwardly through the fruit and downstream from said radially directed jets.

References Cited in the file of this patent

UNITED STATES PATENTS

| | | |
|---|---|---|
| 846,211 | Johnson | Mar. 5, 1907 |
| 2,549,333 | Polk et al. | Apr. 17, 1951 |
| 2,560,128 | Polk et al. | July 10, 1951 |
| 2,607,381 | Polk et al. | Aug. 19, 1952 |
| 2,627,884 | Polk et al. | Feb. 10, 1953 |
| 2,730,149 | Aguilar et al. | Jan. 10, 1956 |

FOREIGN PATENTS

| | | |
|---|---|---|
| 762,602 | France | Jan. 22, 1934 |